2,804,436
STARCH-CLAY COATING COLORS

Daniel D. Ritson, Riverside, Conn., assignor to American Cyanamid Company, New York, N. Y., a corporation of Maine No Drawing. Application January 31, 1955,
Serial No. 485,331

5 Claims. (Cl. 260—17.4)

The present invention relates to fluid aqueous starch-clay suspensions for coating paper, and particularly to such starch-clay suspensions containing a water-soluble anionic linear carbon chain polymer as supplementary adhesive. The invention includes methods for preparing the suspensions and paper and other cellulosic webs coated on one or both sides therewith.

At the present time, coating colors for paper generally contain as their principal components a deflocculated clay, an adhesive, such as a hydrophilic starch adapted to bind the clay to the paper, and water.

Present day coating colors are generally applied by brush, air jet, doctor blade or roller coater at viscosities within the range of roughly 100 and 25,000 centipoises, depending principally upon the type of coating machine used, the type of paper to which it is applied and the amount of the coating which it is desired to apply. At such viscosities, coating colors contain a very substantial amount of water, typically 30% to 70% by weight. The paper is then dried and calendered to impart a glossy finish thereto.

The discovery has now been made that clay-starch coating colors containing a water-soluble high molecular weight anionic linear carbon chain polymer, at least 20% of the linear carbon atoms of which carry one ionic carboxylic group each, are capable of forming a much more adhesive and more durable coating at the sacrifice of only a slight increase in viscosity. On application to paper, the clay is more strongly bound to the fibers, thus decreasing the dusting which normally takes place when the paper is passed through calender rolls. The wet rub resistance and wax pick values of the paper are substantially greater than would otherwise be the case.

The invention permits the coating to possess a higher proportion of clay to adhesive and thus possess improved opacity and printability.

The coating colors of the present invention consist essentially of an aqueous dispersion of a deflocculated paper coating clay alone or in admixture with a minor amount of other hydrophilic inorganic pigments, and an adhesive mixture consisting essentially of a hydrophilic starch, and one or more of the polymers referred to above.

The weight of the polymers in the coating color should not be materially in excess of the weight of the starch. When a higher proportion of polymer is present, the clay tends to flocculate, resulting in a "grainy" suspension which cannot be satisfactorily used. Moreover, the viscosity of the mixture rises sharply. On the other hand, when the weight of the polymer is less than about 10% of the weight of the starch the beneficial effect of the polymer in improving pigment adhesion are masked and substantially the same results are obtained as when only starch is present. In practice we prefer that the weight ratio of starch to polymer be between about 80:20 and 50:50, as within this range the beneficial effects imparted by each material are well exhibited while the amount of the usually more costly polymer present is minimized.

In the composition, the combined weight of the starch and polymer should be sufficient to bind the pigment strongly to the paper. Between about 5% and 20% thereof based on the weight of the clay gives good results. In practice we prefer to have present from about 5% to 10% of the two adhesives based on the weight of the clay, this amount giving very satisfactory wet-rub values while maintaining the clay: adhesive ratio high, resulting in formation of a coated paper of maximum practical opacity and printability.

The total amount of water present is the minimum needed to produce the desired viscosity, but the particular amount in any instance is not a feature of this invention. The amount of water present is limited so that the composition has a suitable viscosity for application by any of the commercial brush, doctor blade or roller coater machines. For application by these machines the amount of water is controlled so that composition has a viscosity between about 100 and 25,000 centipoises and contains about 30% to 70% solids.

The coating colors are applied to paper by known methods at any customary film thickness. The wet coated paper is heated at 160°–250° F. until dry, and is calendered or supercalendered, giving it a high gloss and fine texture. The wet rub resistance of the coating may be increased by contacting the coating (either before or after drying) with an aqueous solution of a polyvalent metal salt, for example aluminum sulfate, also by known methods.

Coating colors of the present invention may be prepared by forming an aqueous starch adhesive dispersion, incorporating a clay slip therein, and finally incorporating an aqueous dispersion of a suitable anionic polymer.

The starch dispersion may be any of the coating or adhesive starches commercially used in the manufacture of coated or adhesive paper or for the sizing of textiles.

A suitable dispersion may be prepared by cooking one part of an oxidized type coating starch with three parts of water at about 190° F. for 15 minutes. Another suitable dispersion may be prepared by cooking one part of a hydroxyethyl starch with four parts of water at about 170° F. for 15 minutes. In addition natural starches such as corn starch, potato starch, tapioca starch or wheat starch rendered dispersible by cooking may be used. Other modified starches may be employed such as the natural starches rendered more dispersible by oxidation, treatment with enzymes, treatment with acids, or treatment with alkalis. Various dextrins may be used in place of starch, including British gum, Canary dextrins and pyrodextrins.

An aqueous suspension of paper-coating clay (together with any desired auxiliary pigmentary material) is formed by slurrying the pigment with water (which advantageously contains a dispersing and deflocculating agent such as sodium hexametaphosphate), and then mixing the starch and clay suspensions. The next step consists of adding the aqueous polymer solution to the aqueous starch-clay suspension thus formed, and stirring until a homogeneous blend is obtained. Ordinarily the suspensions are then ready for use.

The polymers employed in the present invention are water-soluble anionic linear substituted polyalkanes between 20% and 75% of the carbon atoms of which carry one ionic carboxyl substituent each, and the remaining linear carbon atoms carry only substituents which are essentially non-ionic such as hydrogen, amide, hydroxyl, alkylamide, dialkylamide, arylamide, diarylamide, hydroxymethylamide, nitrile, carbalkoxy, alkoxyalkyl, aryl, alkyl, and aralkyl. Because of the requirement that the polymer be water-soluble, it is preferred that the non-ionic substituents be hydrophilic, and substituents such as hydrogen, hydroxy and amide are preferred. Ionic carboxyl substituents are carboxyl groups and their ionizable salts.

Polyalkanes suitable for employment in the present invention may be prepared by homopolymerizing acids such as acrylic acid and methacrylic acid. In these polyalkanes, 50% of the linear carbon atoms carry one ionic carboxyl group each and the remaining carbon atoms carry only non-ionic substituents (hydrogen or methyl). In addition, there may be used copolymers of acrylic acid or other $\alpha,\beta$-unsaturated water-soluble acid with acrylamide and similar $\alpha,\beta$-unsaturated water-soluble amides, provided that sufficient acid is taken that after copolymerization, at least 20% of the linear carbon atoms carry ionic carboxyl groups. Such a polymer is formed from acrylic acid and acrylamide in 40:60 molar ratio. In such polymers about 30% of the linear carbon atoms carry amide groups. In copolymers formed by copolymerizing acrylic acid with maleic acid in 1:1 molar ratio, 75% of the chain carbon atoms carry one ionic carboxyl group each. The ratio of ionic carboxyl groups to non-ionic groups can be varied within wide limits by appropriate selection of the monomers used. In addition to those set forth above, suitable monomers which may be used in minor amount for varying this ratio include acrylonitrile, styrene, methylstyrene, methoxymethylstyrene, methyl acrylate, methyl methacrylate, ethyl acrylate, ethyl methacrylate, etc. Polyvinyl acetate may be employed followed by hydrolysis to supply hydroxyl groups.

In addition, polymers containing sufficient carboxyl groups may be formed by partial or complete hydrolysis of such materials as polyacrylonitrile, polyacrylamide, polyethylacrylate, polymethylacrylate, etc. In practice, best results have been obtained by copolymerizing acrylic acid with acrylamide in 40:60 to 80:20 molar ratio, respectively.

Good results have been obtained with polymers having calculated molecular weights as low as 5,000 as well as with polymers having calculated molecular weights as high as 150,000. The evidence is thus that the molecular weight may be as low as 1,500 and that chain length is not a particular feature of the invention.

The present invention permits the use of any of the clays customarily used for coating paper including the hydrous aluminum silicates or kaolin group clays, hydrated silica clays, and the specific types of clays recommended in the book "Kaolin Clays and Their Industrial Uses," copyright 1949 by J. M. Huber Corp., New York, N. Y., particularly in chapters 10–16 thereof. These clays are usually employed as such, but if desired a minor amount up to about 50% may be replaced by calcium carbonate, blanc fixe or lithopone or a high opacity pigment such as zinc sulfide, zinc oxide, or titanium dioxide. Dispersion of the clay in water or in aqueous starch solution is facilitated by the presence therein of a sufficient amount of dispersing agent to deflocculate the clay and for this purpose material such as tetrasodium pyrophosphate or sodium tetraphosphate is suitable.

The coating colors of the present invention may contain fluidifying agents for the starch in customary small amounts such as urea, dicyandiamide, and methylol dicyandiamide, as well as dyes, pigments, and mold growth inhibitors including pentachlorophenol.

The invention will be more particularly illustrated with reference to the examples, which are embodiments of the invention and which are not to be construed as limitations thereon.

*Example 1*

The following tests were performed to illustrate the behavior of one series of anionic polymers upon the viscosity of aqueous starch-clay coating compositions and the wet-rub resistance of such coatings when applied to paper.

The polymers were prepared by homopolymerizing acrylamide, by copolymerizing acrylic acid and acrylamide in molar ratios shown in the table below, and by homopolymerizing acrylic acid. The polymers were prepared by refluxing 15% dioxane solutions of the monomeric materials, using 0.5% benzoyl peroxide as catalyst, after which the dioxane was stripped off and replaced by water.

A starch solution was prepared by cooking a chlorinated starch commonly used for coating paper known as "Stayco M" starch with water at 25% solids until a homogeneous paste formed.

A clay slip was formed by dispersing HT coating clay ((a kaolinite paper-coating clay) in water at about 66% solids, using 0.1% of sodium hexametaphosphate based on the weight of the clay as dispersing agent. The slip was sieved through a 200 mesh screen to remove lumps.

The cooked starch was added to the clay slip in amount sufficient to provide 5% of cooked starch on the weight of the clay, and the resulting coating color was divided into equal portions.

To each portion was added 5% (based on the weight of the clay) of an aqueous solution of one of the polymers shown in the table. Each of the resulting compositions thus contained 50% solids by weight, the polymer being regarded as a solid.

A control composition was prepared in the same manner except that the weight of the starch was increased to 10% of the weight of the clay and no polymer was added.

The viscosity (Brookfield) of each of the compositions was determined as shown in the table.

The compositions were applied at a 15 lb./rm. coat weight to a sulfite-soda stock having a basis weight of 50 lb. per 25" x 38"/500 ream and the sheets dried at room temperature.

The coated sheets of paper were subjected to a laboratory wet-rub test. The results are reported on a scale of 10 in which 0 designates rapid and extensive removal of the coating, 10 designates no removal of the color, and intermediate values designate intermediate color removal. On this scale the paper containing starch alone as the pigment adhesive gives a value of 0, and a value of about 7 is considered entirely satisfactory.

The facts most apparent from the table are these:

1. Replacement of half of the starch of the coating formulation by pure polyacrylamide or a high arylamide-low acrylic acid copolymer (colors A–D) gave coating colors which had undesirably high viscosities and which yielded poor wet-rub resistance values.

2. Replacement of half of the starch of the coating formulation by a low acrylamide-high acrylic acid copolymer or by pure polyacrylic acid (colors E–H) gave coating colors which had satisfactorily low viscosities, and which yielded excellent wet-rub resistance values.

3. The amount of adhesive and water in formulation E–H may be materially decreased while producing a coating color that is at least the equal of the control color.

|  | Coating Color | | | | | | | | |
|---|---|---|---|---|---|---|---|---|---|
|  | Control | A | B | C | D | E | F | G | H |
| Compositions: | | | | | | | | | |
| Starch, percent [1] | 10 | 5 | 5 | 5 | 5 | 5 | 5 | 5 | 5 |
| Polymer, percent [1]— | | | | | | | | | |
| Mols Amide / Acid | | | | | | | | | |
| 100 / ----- | | 5 | | | | | | | |
| 90 / 10 | | | 5 | | | | | | |
| 85 / 15 | | | | 5 | | | | | |
| 80 / 20 | | | | | 5 | | | | |
| 60 / 40 | | | | | | 5 | | | |
| 40 / 60 | | | | | | | 5 | | |
| 20 / 80 | | | | | | | | 5 | |
| ----- / 100 | | | | | | | | | 5 |
| Properties: | | | | | | | | | |
| Percent solids | 50 | 50 | 50 | 50 | 50 | 50 | 50 | 50 | 50 |
| Viscosity, cps | 636 | 26,800 | 11,840 | 5,500 | 4,480 | 2,400 | 2,040 | 1,376 | 1,040 |
| Results: | | | | | | | | | |
| Wet/rub value | 0 | 2 | 6− | 6 | 6+ | 8− | 8 | 8+ | 9− |
| Wax pick (Dennison) | 2 | 4 | 5 | 5.0 | 5.5 | 6 | 7 | 5.5 | 4.5 |

[1] On wt. of clay.

*Example 2*

The procedure of Example 1 was repeated except that freshly prepared samples of starch and polymer were employed, and the coated paper was subjected to the Dennison wax pick test to determine the strength with which coating was bound to the paper.

Results are as follows:

|  | Coating color | | | | |
|---|---|---|---|---|---|
|  | Control | A | B | C | D |
| Composition: | | | | | |
| Starch, percent [1] | 10 | 6 | 6 | 6 | 6 |
| Polymer, percent [1]— | | | | | |
| Mols Amide / Acid | | | | | |
| 100 / ----- | | 4 | | | |
| 40 / 60 | | | 4 | | |
| 20 / 80 | | | | 4 | |
| ----- / 100 | | | | | 4 |
| Results: | | | | | |
| Wax pick, Dennison | 2.0 | 2.2 | 6.0 | 5.5 | 4.5 |
| Wet-rub value | 0 | 2.0 | 7 | 7+ | 7 |

[1] On weight of clay.

The results show that replacing a minor proportion of the starch with a polymer of the present invention doubled or tripled the wax pick values, depending on the polymer composition.

I claim:
1. A stable fluid aqueous coating color for paper, comprising a hydrophilic paper coating clay in deflocculated condition as principal pigment therein and an adhesive mixture in amount between 5% and 20% of the weight of said clay, said adhesive mitxure consisting essentially of a hydrophilic starch and a water-soluble anionic linear substituted polyalkane having a molecular weight in excess of about 1,500 between 20% and 75% of the linear carbon atoms of which carry one ionic carboxylic substituent each and the remaining linear carbon atoms carry non-ionic substituents only, the weight of said polyalkane being at least 10% but not in excess of the weight of said starch.
2. A coating color according to claim 1, wherein the starch is a chlorinated coating starch.
3. A coating color according to claim 1, wherein not fewer than 20% and not more than 40% of the linear carbon atoms of the polyalkane carry carboxylic substituents.
4. A composition according to claim 1, wherein the polymer is formed by copolymerization of a mixture of monomers comprising acrylic acid and acrylamide in respective molar ratio between 40:60 and 80:20.
5. A cellulosic web coated on at least one side with a coating color according to claim 1.

References Cited in the file of this patent

UNITED STATES PATENTS

| 2,487,448 | Kingerley | Nov. 8, 1949 |
| 2,661,309 | Azorlosa | Dec. 1, 1953 |

OTHER REFERENCES

"Vinyl and Related Polymers," Schildknecht, John Wiley and Sons, Inc., N. Y. (1952), page 305.